G. HORVATH.
RADIATOR TUBING.
APPLICATION FILED DEC. 11, 1917.

1,294,465.  Patented Feb. 18, 1919.

Inventor
Geza Horvath.

Witness
Charles Balg.
Karl H. Butler.

By
Attorneys

UNITED STATES PATENT OFFICE.

GEZA HORVATH, OF HIGHLAND PARK, MICHIGAN.

RADIATOR-TUBING.

1,294,465.     Specification of Letters Patent.     Patented Feb. 18, 1919.

Application filed December 11, 1917. Serial No. 206,598.

*To all whom it may concern:*

Be it known that I, GEZA HORVATH, a citizen of the United States of America, residing at Highland Park, in the county of Wayne and State of Michigan, have invented certain new and useful Improvements in Radiator-Tubings, of which the following is a specification, reference being had therein to the accompanying drawings.

This invention relates to radiator tubing, and has special reference to tubing adapted to form conduits for radiators that may be used in connection with the power plants of automobiles, airplanes, and various kinds of craft, although the principle involved in producing the tubing or conduit permits of a structure being produced that has various uses. Furthermore, my invention has special reference to a rigid, non-flexible tube or conduit in contradistinction to those fabricated tubes or conduits that may be bent at will and possess a degree of flexibility so that such tubes or conduits may be used in various ways.

The primary object of my invention is to provide a rigid tube or conduit that may be fabricated from a metallic ribbon that is spirally wound with the convolutions thereof closely assembled so as to provide practically a continuous rigid cylindrical wall forming a non-leakable tubular conduit through which liquids or fluids may be safely conducted. In order that the spirally wound ribbon may have the convolutions thereof interlocked to form a rigid, cylindrical wall, the ribbon has a channel cross sectional shape, and the flanges of such a metallic ribbon are of sufficient depth to permit of the ribbon convolution being interlocked and at the same time afford spiral heat disseminating fins which will cause a maximum heat radiation from the tube or conduit without sacrificing the rigidity or strength of the same. The formation of the heat radiating fins is such as to provide maximum air contacting surfaces for the tube or conduit, and a non-leakable, cylindrical wall is assured by interlocking the convolutions of the metallic ribbon in a manner that permits of the tube or conduit being dipped in solder or other sealing material so that the joints or contacting surfaces of the ribbon convolutions may be positively sealed; the excess solder or sealing material being brushed or otherwise removed from the structure.

A further object of my invention is to utilize the principle of constructing a tube or conduit, as herein disclosed, for making engine jackets, armored pipes, and any conduit for liquid or fluid. In some instances, the interlocked edges of the metallic ribbon from which the structure is formed may serve as heat disseminating fins, reinforcing ribs for the periphery of the structure, or spacing members for the structure in another structure of larger diameter, and in consequence of the advantage gained by this novel construction, both from a commercial and manufacturing standpoint, I do not care to confine my invention to any particular use.

The above are a few of the objects attained by the mechanical construction hereinafter specifically described and then claimed, and reference will now be had to the drawings, wherein—

Figure 1:
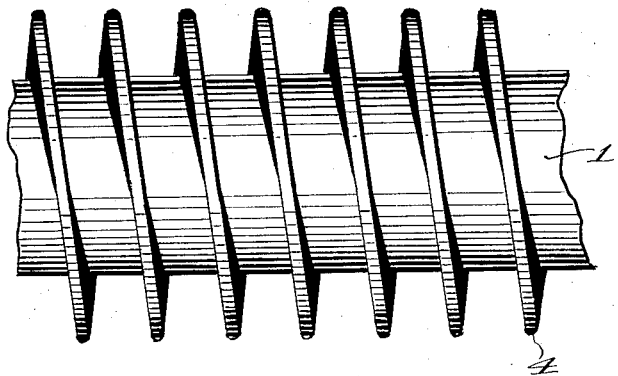
Figure 1 is a side elevation of a piece of tubing or a conduit in accordance with my invention.

In the drawing, 1 denotes a metallic ribbon that may be made of brass or other metal, and this piece of ribbon has parallel side flanges 2 and 3 disposed at a right angle to the body of the ribbon in order to impart a channel shape thereto. The flanges 2 and 3 may be of less or greater width than the body of the ribbon, but are preferably of such width as to provide a channel ribbon of cross sectional shape possessing considerable rigidity so that the flanges will not weaken the body of the ribbon, particularly after the flanges are interlocked.

The flange 3 of the channel ribbon is provided with an outstanding clenching extension 4 and in the rolling or formation of the metallic channel ribbon the extension 4 is disposed in a plane parallel to the plane of the body of the ribbon or at a right angle to the flange 3. With the clenching extension so disposed, it is possible to spirally wind or helically dispose the metallic channel ribbon so that the convolutions thereof will be closely assembled with the flanges 3 contacting with the flanges 2 and the clenching extension 4 of the flange 3 overlying the outer edge of the flange 2. In spirally winding the metallic channel ribbon, the clenching extension serves as a stop or guide for the flange 2, thus permitting the flanges 2 and 3 being correctly positioned during the formation of the tube or conduit without any danger of there being irregular convolutions. It is obvious that when the ribbon is made of brass or of metal possessing a degree of resiliency, that during the winding and bending of the ribbon it will have a tendency to assume normal shape or position, consequently the edge of the flange 2 will bear against the clencher extension 4 of the flange 3, and in this manner the tube or conduit is assured of having a uniform diameter throughout.

Figure 2:
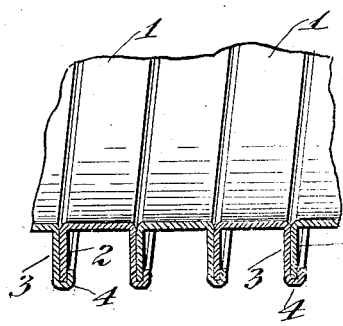
Fig. 2 is a longitudinal sectional view of a portion of the same.

As intimated in the beginning, the channel ribbon may be rolled or otherwise formed and to spirally wind or convolute the ribbon, it may be wound on a mandrel, with the convolutions thereof in contact, and during such operation or independent thereof the clencher extension 4 of the flange 3 may be reamed or bent or otherwise operated on so that it will be forced over the edge of the flange 2 and clenched against the outer wall of said flange, as best shown in Fig. 2, thereby forming a spiral groove into which the edge of the flange 2 extends and may be sealed therein when the articulated convolutions of a tube or conduit are dipped into molten solder or other sealing material. The solder or sealing material will necessarily enter such spaces as may exist between the flanges 2 and 3 and excess solder or sealing material may be brushed or otherwise removed from the tube or conduit.

From the foregoing it will be observed that the contacting flanges 2 and 3 provide two-ply spiral fins or ribs on the periphery of the cylindrical wall forming the tube or conduit, and these fins or ribs not only reinforce and add rigidity to the walls of the tube or conduit, but constitute a heat disseminating or radiating means. In connection with a radiator and with the tubes or conduits closely assembled, the fins or ribs will break up air currents passing between the tubes or conduits causing all outer surfaces of the tubes or conduits to be exposed to cooling by air, and should the tubes or conduits be immersed in a cooling agent, then the contents of the tubes or conduits will be cooled by conduction. As a further instance, the fins or ribs may constitute spiral partitions when my tube or conduit is placed in another of larger diameter, thus providing a passage about my tube or conduit through which a cooling agent may be circulated.

Figure 4:
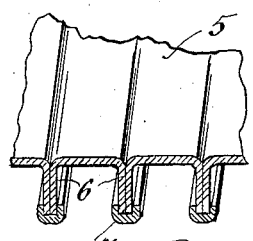
Fig. 4 is a view similar to Fig. 2 of a modified form of tube.
Figure 3:
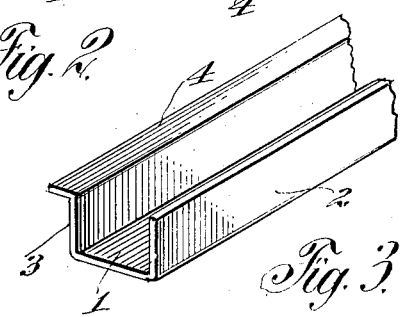
Fig. 3 is a perspective view of a portion of a metallic ribbon from which the tube or conduit may be formed.

In Fig. 4 of the drawing, there is illustrated a modification of my invention, wherein the tube or conduit is made of two ribbons spirally wound with one ribbon connecting convolutions of the other ribbon. The main ribbon which forms the wall of the tube or conduit is designated 5, and this ribbon is channel shaped with the side flanges 6 thereof identical. When winding the ribbon 5 the flanges 6 of one convolution are brought into contact with the flanges of adjoining convolutions, and the other ribbon is designated 7 and is channel shaped in cross section. As the ribbon 7 is wound it is placed on the edges of the flanges 6 to connect said flanges. This form of tube or conduit may have the flanges 6 connected by solder and the ribbon 7 soldered on the edges of the flanges 6.

With either form of tube or conduit, the same may be made oval, rectangular or of any other desired cross sectional shape and welding or brazing may be resorted to, in lieu of solder particularly when the tubes of conduits are of considerable size and made of heavier material than sheet brass. Such heavy tubes or conduits may be advantageously used as cooling devices for various kinds of engines; cooling devices in connection with refrigeratory plants, radiators in connection with dry kilns and factories. It is in the latter instance that radiators may be constructed that will occupy a comparatively small space, compared to the present form of radiators constructed of cast iron pipes connected by elbows and other connections.

I am aware of tubes or conduits being formed by spirally or helically winding a metallic ribbon, but such tubes or conduits have required packing at the joints of the convolutions or such joints were complicated and required expensive and especially designed machinery to form and seal the same, whereas the tube or conduit in accordance with my invention may be expeditiously and economically produced to provide an extremely rigid structure.

What I claim is:—

1. A tube or conduit comprising a helically disposed metallic channel shaped ribbon having the flanges thereof approximately the same depth as the width of the ribbon and the flanges of one convolution contacting with flanges of adjoining convolutions, and one of the flanges of the channel ribbon provided with a clencher extension bent over into clenching relation with the contiguous flange.

2. As a new article of manufacture, a rigid and non-flexible tube made of a metallic channel ribbon helically disposed to provide contacting convolutions and adjoining flanges of said ribbon, the flanges being of a depth approximately the width of the ribbon, if not greater, and spirally disposed on the periphery of the tube with one flange clenched on the edge of the adjoining flange to form a two-ply fin devoid of packing and outstanding from the periphery of the tube to radiate heat.

In testimony whereof I affix my signature in the presence of a witness.

GEZA HORVATH.

Witness:
KARL H. BUTLER.